United States Patent [19]

Dix et al.

[11] Patent Number: 5,411,556
[45] Date of Patent: May 2, 1995

[54] DYEING LEATHER WITH A RED AZO DYE

[75] Inventors: Johannes P. Dix, Weisenheim; Gunther Lamm, Hassloch; Helmut Reichelt, Neustadt; Georg Zeidler, Dannstadt-Schauernheim, all of Germany

[73] Assignee: BASF Aktiengesellshaft, Ludwigshafen, Germany

[21] Appl. No.: 136,032

[22] Filed: Oct. 14, 1993

[30] Foreign Application Priority Data

Nov. 19, 1992 [DE] Germany .................. 42 38 903.8

[51] Int. Cl.⁶ .............................................. D06P 3/32
[52] U.S. Cl. .................................... 8/437; 8/436; 8/681; 8/687
[58] Field of Search ................ 8/437, 687, 641, 681, 8/436

[56] References Cited

U.S. PATENT DOCUMENTS

| | | | |
|---|---|---|---|
| 2,405,835 | 8/1946 | Krebser et al. | 260/178 |
| 4,116,624 | 9/1978 | Bitterlin et al. | 8/42 |
| 4,143,034 | 3/1979 | Jefferies et al. | 8/687 |
| 4,822,424 | 5/1989 | Senshu et al. | 106/22 |

FOREIGN PATENT DOCUMENTS 2006305 12/1969 France .
742662 12/1943 Germany .

*Primary Examiner*—Paul Lieberman
*Assistant Examiner*—Caroline L. Dusheck
*Attorney, Agent, or Firm*—Oblon, Spivak, McClelland, Maier, & Neustadt

[57] ABSTRACT

There is described a process for dyeing leather with the dye of the formula

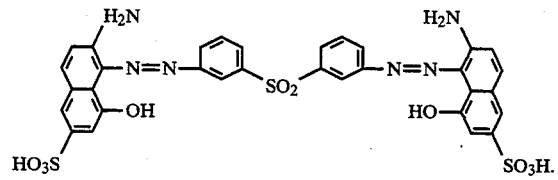

1 Claim, No Drawings

DYEING LEATHER WITH A RED AZO DYE

The present invention relates to a novel process for dyeing leather in a red shade by means of a sulfo-containing azo dye.

It is known that metal-free, acidic azo dyes are in many cases suitable for dyeing leather. Frequently, these dyes are insufficiently fixed, in particular on relatively severely retanned leathers, so that exhaustion of the dyebath is poor and the perspiration and wash fastness properties are inadequate.

It is an object of the present invention to provide a novel process for dyeing leather using a sulfo-containing azo dye. The leather dyed with this dye shall have good service/in-use properties. Moreover, the dye employed in the novel process shall exhaust to a high degree; that is, the spent liquor from the dyeing process shall be substantially free of dye.

We have found that this object is achieved in an advantageous manner on treating leather with the dye of the formula

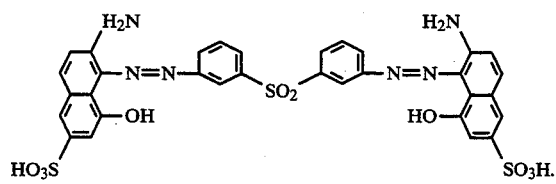

The leather to be dyed can in general be commercial mineral tanned (eg. tanned on the basis of the metals chromium, aluminum, titanium or zirconium) or else leather tanned without any metal (for example purely vegetable-tanned leather). These kinds of leather are used for example for making leather garments, as upholstery leather or as shoe uppers.

The treatment of the leather with the above-mentioned dye in general takes place in an aqueous liquor. In terms of the dry weight of the leather, the dye is in general used in an amount of from 0.5 to 15% by weight, preferably from 1 to 8% by weight. The dye has been dissolved in the aqueous liquor.

The process of the invention is usually carried out at from 25° to 60° C., preferably at from 30° to 55° C.

The novel process is advantageously carried out by first neutralizing the leather, for example retanned chrome cowhide leather, for example by drumming the leather in aqueous alkali metal bicarbonate and alkali metal formate solution. The neutralized leather is then washed with water and drummed at the abovementioned temperature with an aqueous liquor containing the dye. After the dyeing has ended, which in general takes from 30 to 90 minutes, a fat liquor is added to the dyeing liquor and the treatment is continued for 30–60 minutes. Finally, the dyeing liquor is acidified, for example with formic acid, and the leather is additionally drummed for 30–60 minutes, rinsed with water, set out, dried, staked and strained.

The dye can be used in the known dyeing processes in the form of commercial formulations, for example with sodium sulfate or dextrins. However, it can also be applied in the form of a predominantly aqueous liquid.

In its salt-free or low-salt form, the abovementioned dye is also advantageous for spray dyeing leather.

The process of the invention produces a bright, deep red on the leather. The leather thus dyed has good wet fastness properties and a high light fastness. What is particularly notable is that the dye employed in the novel process exhibits excellent exhaustion.

The dye used in the novel process is known from DE-C-742 662. There it is recommended for dyeing wool. Nothing is said about its usefulness for dyeing leather, nor was it indeed foreseeable that, used in this way, it would give the abovementioned advantageous properties.

Embodiments of the invention will now be more particularly described by way of example.

EXAMPLE 1

(Preparation)

374 g of 3,3'-diaminodiphenyl sulfone were conventionally tetrazotized with sodium nitrite in aqueous hydrochloric acid. After excess nitrous acid had been destroyed, the pH of the diazonium salt solution was raised with sodium formate from 2.5 to 3 and the diazonium salt solution obtained was added over 2 hours to a freshly prepared suspension of 735 g of 2-amino-8-hydroxynaphthalene-6-sulfonic acid in 2700 ml of water, which had a pH of from 2 to 2.5. The coupling reaction was maintained at a pH of from 1.5 to 2.5 with sodium formate and took about 8 hours at 25° C. The precipitated dye was filtered off with suction, washed with a little water acidified with sulfuric acid (pH 1) and then dried, leaving 1300 g of a red powder which still contained 4% by weight of sodium chloride and about 0.5–1% by weight of sulfuric acid.

The dye can be converted into a salt-free form by dialysis. It is then very highly suitable for spray dyeing leather or in the ink-jet process.

EXAMPLE 2

(Use)

100 g of a retanned chrome cowhide leather with a shaved thickness of 14 mm were neutralized in 200 ml of water at 30° C. with 1 g of sodium bicarbonate and 1 g of sodium formate by drumming for 45 minutes in a kicker. The leather was then washed in 200 ml of fresh water at 30° C. by drumming for 15 minutes. Then the dyeing was carried out by drumming for 45 minutes in 200 ml of water at 50° C. containing 1% by weight of the dye described in Example 1.

Thereafter 4 g of a commercial fatliquor were added and the drumming was continued for 30 minutes. After acidification with 0.5 g of formic acid the leather was drummed for a further 30 minutes, then rinsed with cold water, set out, dried, strained, staked and strained. A bright, deep red was obtained on the leather. The dyeing has good light fastness and good wet fastness properties. The spent liquor is virtually free of dye.

We claim:

1. A process for dyeing leather, which comprises treating the leather with the dye of the formula

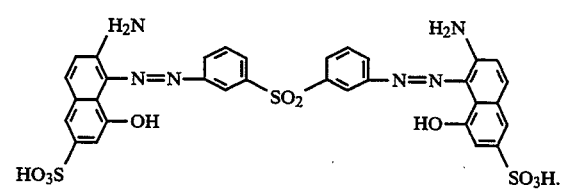

* * * * *